(12) United States Patent
Soltys et al.

(10) Patent No.: US 7,510,194 B2
(45) Date of Patent: Mar. 31, 2009

(54) PLAYING CARDS WITH SEPARABLE COMPONENTS

(75) Inventors: Richard Soltys, Mercer Island, WA (US); Richard Huizinga, Mercer Island, WA (US); Allen Fleckenstein, Bellevue, WA (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

(21) Appl. No.: 11/170,761

(22) Filed: Jun. 28, 2005

(65) Prior Publication Data

US 2006/0001217 A1 Jan. 5, 2006

Related U.S. Application Data

(60) Provisional application No. 60/584,395, filed on Jun. 30, 2004.

(51) Int. Cl.
*A63F 1/12* (2006.01)
(52) U.S. Cl. .................................. 273/293; 273/149 R
(58) Field of Classification Search ................. 273/293, 273/295, 296, 149 R, 149 P
See application file for complete search history.

(56) References Cited

U.S. PATENT DOCUMENTS

| | | | |
|---|---|---|---|
| 1,034,402 A | 7/1912 | Hardy | |
| 1,727,800 A | 9/1929 | Albert | |
| 1,890,504 A * | 12/1932 | Ferguson, Jr. | ............... 428/138 |
| 2,567,223 A | 9/1951 | Maher | |
| 2,663,418 A * | 12/1953 | Grunwald | ................... 206/455 |
| 2,694,662 A | 11/1954 | Hunter, Jr. | .................. 154/121 |
| 2,731,271 A | 1/1956 | Brown | |
| 3,222,071 A | 12/1965 | Lang | .......................... 273/149 |
| 3,312,473 A | 4/1967 | Friedman et al. | ............ 273/149 |

(Continued)

FOREIGN PATENT DOCUMENTS

DE 44 39 502 C1 9/1995

(Continued)

OTHER PUBLICATIONS

Adhesive-Wikipedia, the free encyclopedia, website located at. http://en.wikipedia.org/wiki/Adhesive, 2008.*

(Continued)

*Primary Examiner*—William M Pierce
(74) *Attorney, Agent, or Firm*—Richard C. Vershave; Ronald Stern; Marvin A. Hein

(57) ABSTRACT

The present discussion generally describes separable playing cards that can be reassembled, methods of separating and reassembling the playing cards, and methods of using the playing cards in a gaming environment. The playing cards are combined from constituent components, which are a face and a back. The face can have a suit marking, a rank marking, or both. The combination of any given face and back represents a pairing. This pairing can be changed or reconfigured by separating the face from the back and reordering at least the faces or the backs. The reordered faces and backs can be assembled back into respective playing cards and used in a subsequent card game. The reordering can be done manually, mechanically, or computationally generated. The playing cards can include unique identifiers that can be read by a machine and used to verify that a sufficient number of the original pairings have been altered.

5 Claims, 9 Drawing Sheets

U.S. PATENT DOCUMENTS

| | | | |
|---|---|---|---|
| 3,377,070 A | 4/1968 | Nottoli | 273/149 |
| 3,493,728 A | 2/1970 | Braden, Jr. et al. | |
| 3,561,756 A | 2/1971 | Barnett | 271/41 |
| 3,667,759 A * | 6/1972 | Barr | 273/295 |
| 3,690,670 A | 9/1972 | Cassady et al. | 273/149 P |
| 3,751,041 A | 8/1973 | Seifert | 273/149 P |
| 3,752,962 A | 8/1973 | Greskovics | 235/61.11 |
| 3,814,436 A | 6/1974 | Boren | 273/149 P |
| 3,897,954 A | 8/1975 | Erickson et al. | 273/149 R |
| 3,929,339 A | 12/1975 | Mattioli | 273/148 A |
| 4,241,921 A | 12/1980 | Miller | 273/148 A |
| 4,244,582 A * | 1/1981 | Raees et al. | 273/293 |
| 4,373,726 A | 2/1983 | Churchill et al. | 273/138 A |
| 4,377,285 A | 3/1983 | Kadlic | 273/148 A |
| 4,457,512 A | 7/1984 | Stevenson | 273/148 |
| 4,497,488 A | 2/1985 | Plevyak et al. | 273/149 R |
| 4,531,187 A | 7/1985 | Uhland | 364/412 |
| 4,531,909 A | 7/1985 | Takeshita | 432/37 |
| 4,534,562 A | 8/1985 | Cuff et al. | 273/149 P |
| 4,586,712 A | 5/1986 | Lorber et al. | 273/149 R |
| 4,636,846 A | 1/1987 | Villarreal | 358/100 |
| 4,659,082 A | 4/1987 | Greenberg | 273/149 R |
| 4,662,637 A | 5/1987 | Pfeiffer | 273/149 P |
| 4,667,959 A | 5/1987 | Pfeiffer et al. | 273/149 R |
| 4,693,480 A | 9/1987 | Smith | 273/296 |
| 4,725,079 A | 2/1988 | Koza et al. | 283/73 |
| 4,728,108 A | 3/1988 | Neuwahl | 273/296 |
| 4,750,743 A | 6/1988 | Nicoletti | 273/148 A |
| 4,770,421 A | 9/1988 | Hoffman | 273/149 R |
| 4,807,884 A | 2/1989 | Breeding | 273/149 R |
| 4,817,528 A * | 4/1989 | Baker | 101/395 |
| 4,822,050 A | 4/1989 | Normand et al. | 273/149 P |
| 4,832,341 A | 5/1989 | Muller et al. | 273/139 |
| 4,832,342 A | 5/1989 | Plevyak et al. | 273/149 R |
| 4,885,700 A | 12/1989 | Kondziolka et al. | 364/519 |
| 4,951,950 A | 8/1990 | Normand et al. | 273/149 P |
| 4,969,648 A | 11/1990 | Hollinger et al. | 273/149 R |
| 4,995,615 A | 2/1991 | Cheng | 273/292 |
| 4,998,737 A | 3/1991 | Lamle | 273/296 |
| 5,000,453 A | 3/1991 | Stevens et al. | 273/149 R |
| 5,039,102 A | 8/1991 | Miller | 273/148 R |
| 5,053,612 A | 10/1991 | Pielemeier et al. | 235/462 |
| 5,067,713 A | 11/1991 | Soules et al. | 273/149 P |
| 5,096,197 A | 3/1992 | Embury | 273/149 R |
| 5,110,134 A | 5/1992 | Laughlin et al. | 273/293 |
| 5,114,153 A | 5/1992 | Rosenwinkel et al. | 273/292 |
| 5,121,921 A | 6/1992 | Friedman et al. | 273/149 P |
| 5,186,464 A | 2/1993 | Lamle | 273/149 R |
| 5,199,710 A | 4/1993 | Lamle | 273/149 R |
| 5,224,712 A | 7/1993 | Laughlin et al. | 273/304 |
| 5,240,140 A | 8/1993 | Huen | 221/13 |
| 5,259,907 A | 11/1993 | Soules et al. | 156/277 |
| 5,261,667 A | 11/1993 | Breeding | 273/149 R |
| 5,275,411 A | 1/1994 | Breeding | 273/149 R |
| 5,303,921 A | 4/1994 | Breeding | 273/149 R |
| 5,312,104 A | 5/1994 | Miller | 273/148 R |
| 5,344,146 A | 9/1994 | Lee | 273/149 R |
| 5,356,145 A | 10/1994 | Verschoor | 273/149 R |
| 5,362,053 A | 11/1994 | Miller | 273/148 R |
| 5,374,061 A | 12/1994 | Albrecht | 273/149 R |
| 5,382,024 A | 1/1995 | Blaha | 273/149 R |
| 5,397,133 A | 3/1995 | Penzias | 273/439 |
| 5,416,308 A | 5/1995 | Hood et al. | 235/454 |
| 5,417,431 A * | 5/1995 | Gluck | 273/293 |
| 5,431,399 A | 7/1995 | Kelley | 273/149 P |
| 5,445,377 A | 8/1995 | Steinbach | 273/149 R |
| 5,487,544 A | 1/1996 | Clapper, Jr. | 273/138 A |
| 5,518,249 A | 5/1996 | Sines et al. | 273/304 |
| 5,575,475 A | 11/1996 | Steinbach | 273/149 R |
| 5,584,483 A | 12/1996 | Sines et al. | 273/149 R |
| 5,605,334 A | 2/1997 | McCrea, Jr. | 273/309 |
| 5,605,504 A | 2/1997 | Huang | 463/22 |
| 5,613,680 A | 3/1997 | Groves et al. | 273/138.2 |
| 5,632,483 A | 5/1997 | Garczynski et al. | 273/148 R |
| 5,654,050 A * | 8/1997 | Whalen-Shaw | 428/35.7 |
| 5,669,816 A | 9/1997 | Garczynski et al. | 463/12 |
| 5,676,372 A | 10/1997 | Sines et al. | 273/149 R |
| 5,681,039 A | 10/1997 | Miller | 273/148 R |
| 5,683,085 A | 11/1997 | Johnson et al. | 273/149 R |
| 5,685,543 A | 11/1997 | Garner | 273/148 A |
| 5,692,748 A | 12/1997 | Frisco et al. | 273/149 R |
| 5,695,189 A | 12/1997 | Breeding et al. | 273/149 R |
| 5,698,839 A | 12/1997 | Jagielinski et al. | 235/493 |
| 5,707,287 A | 1/1998 | McCrea, Jr. | 463/27 |
| 5,718,427 A | 2/1998 | Cranford et al. | 273/149 R |
| 5,722,893 A | 3/1998 | Hill et al. | 463/47 |
| 5,735,525 A | 4/1998 | McCrea, Jr. | 273/309 |
| 5,769,458 A | 6/1998 | Carides et al. | 283/102 |
| 5,770,533 A | 6/1998 | Franchi | 463/42 |
| 5,772,505 A | 6/1998 | Garczynski et al. | 463/12 |
| 5,779,546 A | 7/1998 | Meissner et al. | 463/25 |
| 5,791,988 A | 8/1998 | Nomi | 463/11 |
| 5,803,808 A | 9/1998 | Strisower | 463/11 |
| 5,831,669 A | 11/1998 | Adrain | 348/143 |
| 5,871,400 A | 2/1999 | Yfantis | 463/22 |
| 5,895,048 A | 4/1999 | Smith, Jr. | 273/293 |
| 5,911,626 A | 6/1999 | McCrea, Jr. | 463/27 |
| 5,941,769 A | 8/1999 | Order | 463/12 |
| 5,941,771 A | 8/1999 | Haste, III | 463/17 |
| 5,944,310 A | 8/1999 | Johnson et al. | 273/149 R |
| 5,945,654 A | 8/1999 | Huang | 235/449 |
| 5,949,050 A * | 9/1999 | Fosbenner et al. | 235/449 |
| 5,954,654 A | 9/1999 | Eaton et al. | 600/462 |
| 5,989,122 A | 11/1999 | Roblejo | 463/22 |
| 6,019,368 A | 2/2000 | Sines et al. | 273/149 R |
| 6,039,650 A | 3/2000 | Hill | 463/47 |
| 6,042,150 A | 3/2000 | Daley | 283/86 |
| 6,068,258 A | 5/2000 | Breeding et al. | 273/149 R |
| 6,093,103 A | 7/2000 | McCrea, Jr. | 463/27 |
| 6,117,012 A | 9/2000 | McCrea, Jr. | 463/27 |
| 6,126,166 A | 10/2000 | Lorson et al. | 273/148 R |
| 6,139,014 A | 10/2000 | Breeding et al. | 273/149 R |
| 6,145,838 A | 11/2000 | White | 273/295 |
| 6,149,154 A | 11/2000 | Grauzer et al. | 273/149 R |
| 6,166,763 A | 12/2000 | Rhodes et al. | 348/143 |
| 6,193,607 B1 | 2/2001 | Kay | 463/22 |
| 6,196,547 B1 | 3/2001 | Pascal et al. | 273/292 |
| 6,217,447 B1 | 4/2001 | Lofink et al. | 463/12 |
| 6,234,898 B1 | 5/2001 | Belamant et al. | 463/25 |
| 6,250,632 B1 | 6/2001 | Albrecht | 273/149 R |
| 6,254,096 B1 | 7/2001 | Grauzer et al. | 273/149 R |
| 6,254,484 B1 | 7/2001 | McCrea, Jr. | 463/27 |
| 6,267,248 B1 | 7/2001 | Johnson et al. | 209/547 |
| 6,267,671 B1 | 7/2001 | Hogan | 463/25 |
| 6,293,546 B1 | 9/2001 | Hessing et al. | 273/138.2 |
| 6,293,864 B1 | 9/2001 | Romero | 463/12 |
| 6,299,167 B1 | 10/2001 | Sines et al. | 273/149 R |
| 6,299,170 B1 | 10/2001 | Yoseloff | 273/292 |
| 6,299,536 B1 | 10/2001 | Hill | 463/47 |
| 6,313,871 B1 | 11/2001 | Schubert | 348/143 |
| 6,325,373 B1 | 12/2001 | Breeding et al. | 273/149 R |
| 6,346,044 B1 | 2/2002 | McCrea, Jr. | 463/27 |
| 6,357,746 B1 | 3/2002 | Sadowski | 273/148 R |
| 6,361,044 B1 | 3/2002 | Block et al. | 273/149 R |
| 6,371,482 B1 | 4/2002 | Hall, Jr. | 273/138.1 |
| 6,386,973 B1 | 5/2002 | Yoseloff | 463/13 |
| 6,402,142 B1 | 6/2002 | Warren et al. | 273/149 R |
| 6,403,908 B2 | 6/2002 | Stardust et al. | 209/587 |
| 6,406,023 B1 | 6/2002 | Rowe | 273/292 |
| 6,409,595 B1 | 6/2002 | Uihlein et al. | 463/29 |
| 6,446,864 B1 | 9/2002 | Kim et al. | 235/382 |
| 6,457,715 B1 | 10/2002 | Friedman | 273/274 |
| 6,460,848 B1 | 10/2002 | Soltys et al. | 273/149 R |
| 6,485,366 B1 | 11/2002 | Rowe | 463/13 |

| Patent No. | Date | Inventor | Class |
|---|---|---|---|
| 6,502,116 B1 | 12/2002 | Kelly et al. | 708/250 |
| 6,508,709 B1 | 1/2003 | Karmarkar | 463/42 |
| 6,514,140 B1 | 2/2003 | Storch | 463/25 |
| 6,517,435 B2 | 2/2003 | Soltys et al. | 463/25 |
| 6,517,436 B2 | 2/2003 | Soltys et al. | 463/29 |
| 6,520,857 B2 | 2/2003 | Soltys et al. | 463/29 |
| 6,527,271 B2 | 3/2003 | Soltys et al. | 273/148 R |
| 6,530,836 B2 | 3/2003 | Soltys et al. | 463/29 |
| 6,530,837 B2 | 3/2003 | Soltys et al. | 463/29 |
| 6,533,276 B2 | 3/2003 | Soltys et al. | 273/148 R |
| 6,533,662 B2 | 3/2003 | Soltys et al. | 463/25 |
| 6,533,664 B1 | 3/2003 | Crumby | 463/42 |
| 6,543,770 B1 | 4/2003 | Kaji et al. | 273/148 R |
| 6,561,897 B1 | 5/2003 | Bourbour et al. | 463/13 |
| 6,568,678 B2 | 5/2003 | Breeding et al. | 273/149 R |
| 6,579,179 B2 | 6/2003 | Poole et al. | 463/25 |
| 6,579,180 B2 | 6/2003 | Soltys et al. | 463/25 |
| 6,579,181 B2 | 6/2003 | Soltys et al. | 463/25 |
| 6,581,747 B1 | 6/2003 | Charlier et al. | 194/214 |
| 6,582,301 B2 | 6/2003 | Hill | 463/11 |
| 6,588,750 B1 | 7/2003 | Grauzer et al. | 273/149 R |
| 6,588,751 B1 | 7/2003 | Grauzer et al. | 273/149 R |
| 6,595,857 B2 | 7/2003 | Soltys et al. | 463/29 |
| 6,629,889 B2 | 10/2003 | Mothwurf | 463/25 |
| 6,638,161 B2 | 10/2003 | Soltys et al. | 463/12 |
| 6,651,981 B2 | 11/2003 | Grauzer et al. | 273/149 R |
| 6,651,982 B2 | 11/2003 | Grauzer et al. | 273/149 R |
| 6,652,379 B2 | 11/2003 | Soltys et al. | 463/22 |
| 6,655,684 B2 | 12/2003 | Grauzer et al. | 273/149 R |
| 6,659,460 B2 | 12/2003 | Blaha et al. | 273/149 R |
| 6,663,490 B2 | 12/2003 | Soltys et al. | 463/25 |
| 6,676,127 B2 | 1/2004 | Johnson et al. | 273/149 R |
| 6,676,522 B2 | 1/2004 | Rowe et al. | 463/42 |
| 6,685,568 B2 | 2/2004 | Soltys et al. | 463/47 |
| 6,688,979 B2 | 2/2004 | Soltys et al. | 463/25 |
| 6,698,756 B1 | 3/2004 | Baker et al. | 273/149 R |
| 6,712,696 B2 | 3/2004 | Soltys et al. | 463/25 |
| 6,719,288 B2 | 4/2004 | Hessing et al. | 273/149 R |
| 6,726,205 B1 | 4/2004 | Purton | 273/148 R |
| 6,728,740 B2 | 4/2004 | Kelly et al. | 708/250 |
| 6,729,956 B2 | 5/2004 | Wolf et al. | 463/25 |
| 6,729,961 B1 | 5/2004 | Millerschone | 463/30 |
| 6,752,312 B1 | 6/2004 | Chamberlain et al. | 235/375 |
| 6,758,751 B2 | 7/2004 | Soltys et al. | 463/29 |
| 6,857,961 B2 | 2/2005 | Soltys et al. | 463/47 |
| 6,889,979 B2 | 5/2005 | Blaha et al. | 273/149 R |
| 6,896,618 B2 | 5/2005 | Benoy et al. | 463/25 |
| 6,923,719 B2 | 8/2005 | Wolf | 463/16 |
| 6,955,599 B2 | 10/2005 | Bourbour et al. | 463/13 |
| 6,964,612 B2 | 11/2005 | Soltys et al. | 463/47 |
| 7,011,309 B2 | 3/2006 | Soltys et al. | 273/149 R |
| 7,029,009 B2 | 4/2006 | Grauzer et al. | 273/149 P |
| 7,073,791 B2 | 7/2006 | Grauzer et al. | 273/149 R |
| 7,137,627 B2 | 11/2006 | Grauzer et al. | 273/149 R |
| 7,255,344 B2 | 8/2007 | Grauzer et al. | 273/149 R |
| 2002/0063389 A1 | 5/2002 | Breeding et al. | 273/292 |
| 2002/0147042 A1 | 10/2002 | Vuong et al. | 463/40 |
| 2002/0163125 A1 | 11/2002 | Grauzer et al. | 273/149 R |
| 2002/0187821 A1 | 12/2002 | Soltys | 463/11 |
| 2003/0032474 A1 | 2/2003 | Kaminkow | 463/25 |
| 2003/0036425 A1 | 2/2003 | Kaminkow et al. | 463/25 |
| 2003/0064774 A1 | 4/2003 | Fujimoto et al. | 463/16 |
| 2003/0073498 A1 | 4/2003 | Grauzer et al. | 463/42 |
| 2003/0176209 A1 | 9/2003 | Soltys et al. | 463/13 |
| 2004/0033095 A1 | 2/2004 | Saffari et al. | 400/120.01 |
| 2004/0067789 A1 | 4/2004 | Grauzer et al. | 463/11 |
| 2004/0100026 A1 | 5/2004 | Haggard | 273/304 |
| 2004/0108255 A1 | 6/2004 | Johnson et al. | 209/547 |
| 2004/0108654 A1 | 6/2004 | Grauzer et al. | 273/148 R |
| 2004/0169332 A1 | 9/2004 | Grauzer et al. | 273/149 R |
| 2004/0207156 A1 | 10/2004 | Soltys et al. | 273/292 |
| 2004/0224777 A1 | 11/2004 | Smith et al. | 463/47 |
| 2005/0012270 A1 | 1/2005 | Schubert et al. | 273/149 R |
| 2005/0023752 A1 | 2/2005 | Grauzer et al. | 273/149 R |
| 2005/0026680 A1 | 2/2005 | Gururajan | 463/25 |
| 2005/0026681 A1 | 2/2005 | Grauzer et al. | 463/29 |
| 2005/0026682 A1 | 2/2005 | Grauzer et al. | 463/29 |
| 2005/0040594 A1 | 2/2005 | Krenn et al. | 273/149 R |
| 2005/0051955 A1 | 3/2005 | Schubert et al. | 273/149 R |
| 2005/0051965 A1 | 3/2005 | Gururajan | 273/292 |
| 2005/0054408 A1 | 3/2005 | Steil et al. | 463/11 |
| 2005/0059479 A1 | 3/2005 | Soltys et al. | 463/29 |
| 2005/0062226 A1 | 3/2005 | Schubert et al. | 273/149 R |
| 2005/0062227 A1 | 3/2005 | Grauzer et al. | 273/149 R |
| 2005/0073102 A1 | 4/2005 | Yoseloff et al. | 273/292 |
| 2005/0093230 A1 | 5/2005 | Grauzer et al. | 273/149 R |
| 2005/0101367 A1 | 5/2005 | Soltys et al. | 463/12 |
| 2005/0121852 A1 | 6/2005 | Soltys et al. | 273/149 P |
| 2005/0137005 A1 | 6/2005 | Soltys et al. | 463/13 |
| 2005/0164761 A1 | 7/2005 | Tain | 463/13 |
| 2005/0288083 A1 | 12/2005 | Downs, III | 463/11 |
| 2005/0288084 A1 | 12/2005 | Schubert | 463/11 |
| 2005/0288085 A1 | 12/2005 | Schubert et al. | 463/11 |

FOREIGN PATENT DOCUMENTS

| | | |
|---|---|---|
| DE | 197 48 930 A1 | 5/1998 |
| EP | 0 327 069 A2 | 8/1989 |
| EP | 0 790 848 | 8/1997 |
| EP | 0 700 980 B1 | 11/1999 |
| EP | 1 291 045 A2 | 3/2003 |
| FR | 530732 | 12/1921 |
| FR | 24238 | 3/1922 |
| FR | 2 775 196 | 8/1999 |
| GB | 2 246 520 A | 2/1992 |
| GB | 2 370 791 A | 7/2002 |
| GB | 2 380 143 A | 4/2003 |
| WO | WO 96/36253 | 11/1996 |
| WO | WO 99/43403 | 9/1999 |
| WO | WO 02/05914 A1 | 1/2002 |
| WO | WO 02/051512 A2 | 7/2002 |
| WO | WO 03/004116 A1 | 1/2003 |
| WO | WO 2006/039308 A2 | 4/2006 |

OTHER PUBLICATIONS

Bravo Gaming Systems, "Casino Table Wager Analysis and Player Tracking System—Table Operations/Unique Features," accessed Apr. 11, 2005, URL = http://www.genesisgaming.com, 4 pages.

Bulavsky, J., "Tracking the Tables," *Casino Journal*, pp. 44-47, May 2004.

Scarne, J., *Scarne's New Complete Guide to Gambling*, Simon & Schuster, Inc., New York, 1974, pp. 358-359.

U.S. Appl. No. 10/885,875, filed Jul. 7, 2004, Soltys et al.
U.S. Appl. No. 10/902,436, filed Jul. 29, 2004, Soltys et al.
U.S. Appl. No. 10/962,166, filed Oct. 8, 2004, Soltys et al.
U.S. Appl. No. 11/059,743, filed Feb. 16, 2005, Soltys et al.
U.S. Appl. No. 11/112,793, filed Apr. 21, 2005, Soltys et al.
U.S. Appl. No. 11/352,416, filed Feb. 10, 2006, Soltys.
U.S. Appl. No. 11/428,240, filed Jun. 30, 2006, Fleckenstein.
U.S. Appl. No. 11/428,244, filed Jun. 30, 2006, Soltys.
U.S. Appl. No. 11/428,249, filed Jun. 30, 2006, Fleckenstein.
U.S. Appl. No. 11/428,253, filed Jun. 30, 2006, Fleckenstein.
U.S. Appl. No. 11/428,258, filed Jun. 30, 2006, Fleckenstein.
U.S. Appl. No. 11/428,264, filed Jun. 30, 2006, Soltys.
U.S. Appl. No. 11/428,286, filed Jun. 30, 2006, Soltys et al.
U.S. Appl. No. 11/437,590, filed May 19, 2006, Soltys et al.
U.S. Appl. No. 11/478,360, filed Jun. 29, 2006, Fleckenstein.
U.S. Appl. No. 11/479,930, filed Jun. 30, 2006, Soltys et al.
U.S. Appl. No. 11/479,963, filed Jun. 29, 2006, Fleckenstein.
U.S. Appl. No. 11/479,991, filed Jun. 29, 2006, Soltys.
U.S. Appl. No. 11/480,273, filed Jun. 30, 2006, Soltys.
U.S. Appl. No. 11/480,275, filed Jun. 30, 2006, Fleckenstein.
U.S. Appl. No. 11/480,295, filed Jun. 29, 2006, Fleckenstein.
U.S. Appl. No. 11/480,321, filed Jun. 30, 2006, Soltys.
U.S. Appl. No. 11/480,345, filed Jun. 30, 2006, Fleckenstein.
U.S. Appl. No. 11/480,349, filed Jun. 30, 2006, Soltys et al.

U.S. Appl. No. 11/519,244, filed Sep. 11, 2006, Soltys et al.
U.S. Appl. No. 60/838,280, filed Aug. 17, 2006, Soltys et al.
Bulavsky, J., "Tracking the Tables," *Casino Journal*, May 2004, pp. 44-47, accessed Dec. 21, 2005, URL = http://www.ascendgaming.com/cj/vendors_manufacturers_table/Trackin916200411141AM.htm, 5 pages.
Burke, A., "Tracking the Tables," reprinted from *International Gaming & Wagering Business*, Aug. 2003, 4 pages.
Griffin, P., *The Theory of Blackjack*, GBC Press, Las Vegas, Nevada, 1979, 190 pages.
Gros, R., "All You Ever Wanted to Know About Table Games," reprinted from *Global Gaming Business*, Aug. 1, 2003, 2 pages.
Pro, L.V., "Book Review—The Card Counter's Guide to Casino Surveillance," *Blackjack Insider Newsletter*, May 2003, #40, accessed Aug. 25, 2006, URL= http:/bjinsider.com/newsletter_40_surveillance.shtml, 5 pages.
Scarne, J., *Scarne's Encyclopedia of Games*, Harper & Row, New York, 1973, p. 153.
Scarne, J., *Scarne's New Complete Guide to Gambling*, Simon & Schuster, Inc., New York, 1974, pp. 358-359.
Snyder, A., "The High-Tech Eye," excerpt from *Blackjack Forum*, Spring 1997, accessed Dec. 21, 2005, from Casino Software & Services, LLC, URL= http://www.casinosoftware.com/bj_forum.html.
Terdiman, D., "Who's Holding the Aces Now!", reprinted from *Wired News*, Aug. 18, 2003, 2 pages.
Ward, K., "BJ Tracking System has Players Down for the Count," *Gaming Today*, Mar. 5, 2002, accessed Dec. 21, 2005, from Casino Software & Services, LLC, URL= http://www.casinosoftware.com/gaming_today.html.
Winkler, C., "Product Spotlight: MindPlay," reprinted from *Gaming and Leisure Technology*, Fall 2003, 2 pages.

Bally TMS, "MPBacc—Intelligent Table Tracking/Features," 2 pages, Nov. 2005.
Bally TMS, "MPBacc—Specifications/Specifications," 2 pages, Nov. 2005.
Bravo Gaming Systems, "Casino Table Wager Analysis and Player Tracking System—Table Operations/Unique Features," accessed Apr. 11, 2005, URL= http://www.genesisgaming.com, 4 pages.
Casino Software & Services, LLC., accessed Aug. 25, 2006, URL= http:/casinosoftware.com/home.html, 6 pages.
International Guild of Hospitality & Restaurant Managers, "Shuffle Master, Inc. (NasdaqNM:SHFL)," accessed Dec. 30, 2003, URL= http://hospitalityguide.com/Financial/Casinos/Shuffle.htm, 3 pages.
Mikohn, "Mikohn Tablelink—The Industry's Premier Table Tracking Solution Delivers Improvements Straight to the Bottom Line," 2 pages, before Jan. 1, 2004.
Mikohn, "Tablelink™, The New Standard in Table Games," before Jan. 1, 2004, 14 pages.
Plaintiff's Declaration of Lawrence Luciano in Opposition to Shuffle Master's Motion for Preliminary Injunction, *Card, LLC* v. *Shuffle Master, Inc.*, D. Nev. (No. CV-N-03-0244-ECR-(RAM)), Nov. 24, 2003.
Shuffle Master, Inc., "Shuffle Master Announces New Products; Intelligent Table System to Be Debuted at G2E," Sep. 10, 2003, 2 pages.
Shuffle Master, Inc., "Shuffle Master Gaming Presents The Ultimate Player Rating System . . . Bloodhound Sniffs Out the Pros and Cons," Dec. 31, 1997, 6 pages.
U.S. Appl. No. 11/558,409, filed Nov. 9, 2006, Soltys.
English Translation of German Patent No. DE 197 48 930, publication dated of May 14, 1998, inventor: Markeev.

* cited by examiner

PLAYING CARDS WITH SEPARABLE COMPONENTS

CROSS-REFERENCES TO RELATED APPLICATION

This application claims the benefit of U.S. Provisional Patent Application No. 60/584,395 filed on Jun. 30, 2004 where this provisional application is incorporated herein by reference in its entirety.

BACKGROUND OF THE INVENTION

1. Field of the Invention

This invention is generally related to playing cards used in games of skill and chance, and in particular to the assembly, disassembly, and distribution of playing cards.

2. Description of the Related Art

Gaming has enjoyed phenomenal growth over the recent past, with the addition of numerous forms of wager based gaming, the legalization of wagering in a large number of jurisdictions domestically and internationally, and the construction of numerous casinos to service the increasing demand for gaming opportunities.

Card games are popular in casinos and are typically played with one or more decks of cards, where each deck typically includes fifty-two cards. A conventional deck of cards will typically include four suit markings: hearts, diamonds, clubs, and spades; and each suit marking will be accompanied by one of fourteen possible rank marking: 2, 3, 4, 5, 6, 7, 8, 9, 10, Jack (J), Queen (Q), King (K) and Ace (A). Card games may, or may not, include wagering based on the game's outcome.

Since the cards are often reused, decks of playing cards must be periodically shuffled to prevent the same card hands from continually reappearing. Shuffling may take place after every card in the deck or decks has been dealt, for example after several hands have been played. Frequent shuffling is intended to prevent a player from gaining an unfair advantage over the house or other players by counting cards.

Manual shuffling tends to slow play down, so mechanical shufflers are often employed to speed up play and to more thoroughly shuffle the cards. The cards are typically shuffled several cards before the end of the deck(s), in an effort to hinder card counting, which may be particularly effective when only a few hands of cards remain (i.e., end game strategy). The ratio of the number of cards dealt to the total number of cards remaining in the deck(s) is commonly known as the penetration. The gaming industry is now introducing continuous shufflers. Continuous shufflers mechanically shuffle the cards remaining to be dealt while one or more hands are being played. The continuous shuffling is one attempt to frustrate attempts at card counting.

Card counting is when a player keeps a mental count of some or all of the cards that have been played. For example, in the game of twenty-one or "blackjack" it is beneficial to determine when all cards with a rank marking of 5 have been dealt (i.e., a "fives strategy"). A "tens strategy" is another card counting method useful in the game of twenty-one. In the "tens strategy," the player increments a count each time a card having a value of 10 appears, and decrements the count when card having a value less than 10 appears. In the "tens strategy" example, the number of "10-value" cards counted may be compared with the estimated total number of cards remaining to be dealt. This comparison gives the player an indication of how much of the remaining deck favors the player with respect to the house. Numerous card counting systems and methods are known.

In addition or alternative to card counting strategies, other players may use a cheating technique known as "marking" the back of the cards, where the marked card gives the cheating player the advantage of remembering the value (i.e., rank marking and suit marking) of the marked card. The cheating player will now know the value of the marked card when it is re-dealt in a subsequent game and since the marked card will most likely ends up in another player's hand, the cheating player now has an advantage. Card marking techniques can be used in blackjack in order to help the player discern whether certain key cards, for example, Aces, have already been played.

Interestingly, card marking is a cheating strategy that is also commonly found in poker games because of the high stakes and because there is a certain acceptance with the players being a bit secretive when handling their own cards during play. Poker has dramatically grown in popularity in casinos and even on television. By way of example, one form of poker that has become extremely popular in casinos is called Texas Hold 'Em. In fact, nationally broadcast poker tournaments like the Travel Channel's World Poker Tour and ESPN's World Series of Poker have resulted in greater numbers of casino patrons playing poker. Many casinos often have full capacity poker tables, which means that they must be that much more vigilant in watching for cheating players.

Card "marking" consists of small cosmetic or geometric alterations to the cards, such as surface scratches, a bend in the corner, or a minute change in design, for example from shading or daubing. Shading cards consists of using a very fine ink to manipulate the design on the backside of certain cards. The mark is generally too small to be readily noticed by someone not specifically looking for it, but making the mark does require some amount of precision. Another technique called daubing utilizes a special ink in the form of a small dauber and special sunglasses. The back of a card is daubed with the special ink, which is invisible to the naked eye, but clearly visible through the special sunglasses. A third type of marking is bending or crimping of a card. The cheating player bends the corner of the card slightly with his thumb or index finger. Alternatively, the cheating player subtly bends the card to give it either a concave or a convex shape that is noticeable with respect to the flat table surface when the card is re-dealt. This physical marking can later be spotted by the cheat, who is likely to remember the suit marking and rank marking of the card, even after the cards have been reshuffled and re-dealt. A final known method of marking is called thumbnail-ing. The cheating player subtly drives a sharpened nail of his or her thumb into the back of a card. The cheating player then anticipates that the thumnailed mark will remain unnoticed to other players and casino employees for the remainder of the playing session.

Although casinos carefully monitor the activities of both players and casino employees, the aforementioned forms of cheating still tend to occur. The fast pace and large sums of money make casinos likely targets for cheating and stealing. Casinos employ a variety of security measures to discourage cheating or stealing by both customers and employees, but many of these security measures are labor intensive and costly. Consequently, there is still a need for improved ways to reduce or eliminate cheating, especially with respect to card games such as poker.

SUMMARY OF THE INVENTION

In one aspect, a playing card includes a face; a back; and a bonding substance applied to at least a portion of one of the constituent playing card components for temporarily attaching the face with the back.

In another aspect, a playing card includes a back having a back surface and a attachment surface, the back surface opposed from the attachment surface; a face having a face surface and an attachment surface, the face surface bearing at least one human-readable suit marking and at least one human-readable rank marking, the attachment surface opposed from the face surface; and a means for at least temporarily attaching the attachment surface of the back with the attachment surface of the face.

In a further aspect, a method of reconfiguring a playing card, the playing card having a face with a face surface and attachment surface opposed from the face surface, the face surface carrying at least one human-readable rank marking and at least one human-readable suit marking, a back having a back surface and an attachment surface opposed from the back surface, the back surface carrying a non-unique pattern, the method includes receiving at least one playing card while the face is at least temporarily attached to the back; acting on an interface region between the attachment surface of the face and the attachment surface of the back; and separating the face from the back.

In yet another aspect, a method of assembling a reconfigurable playing card for use in a card game includes receiving a face having a face surface and a attachment surface; receiving a back to be matched with the face, the back having a bonding face opposed from a backing; and attaching the bonding face of the back with the attachment surface of the face to assemble a quantity of playing cards.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with playing card materials, finishing techniques, graphic designs and printing, and specific aspects of various card-related games have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

The headings provided herein are for convenience only and do not interpret the scope or meaning of the claimed invention.

Recombineable Playing Cards

In the foregoing discussion describing the related art, it is apparent that there are certain drawbacks to reusing playing cards, even if the cards are periodically or continuously reshuffled. One of those drawbacks is that fact that players sometimes mark cards in quite subtle ways. Casinos are relegated to accepting losses due to cheating as a matter of doing business, hiring more labor to monitor the casino floors, or forced to continually replace used decks of playing cards with fresh, unused decks. However, each of the above options can be cost prohibitive for a casino, for example, consider the numerous quantities of playing card decks that must be continually purchased and kept in stock. Therefore, it would be advantageous to provide playing cards 10 with separable, yet re-combinable and re-usable constituent components, which comprise the face 12 and the back 14 of the playing card 10.

Figure 1:
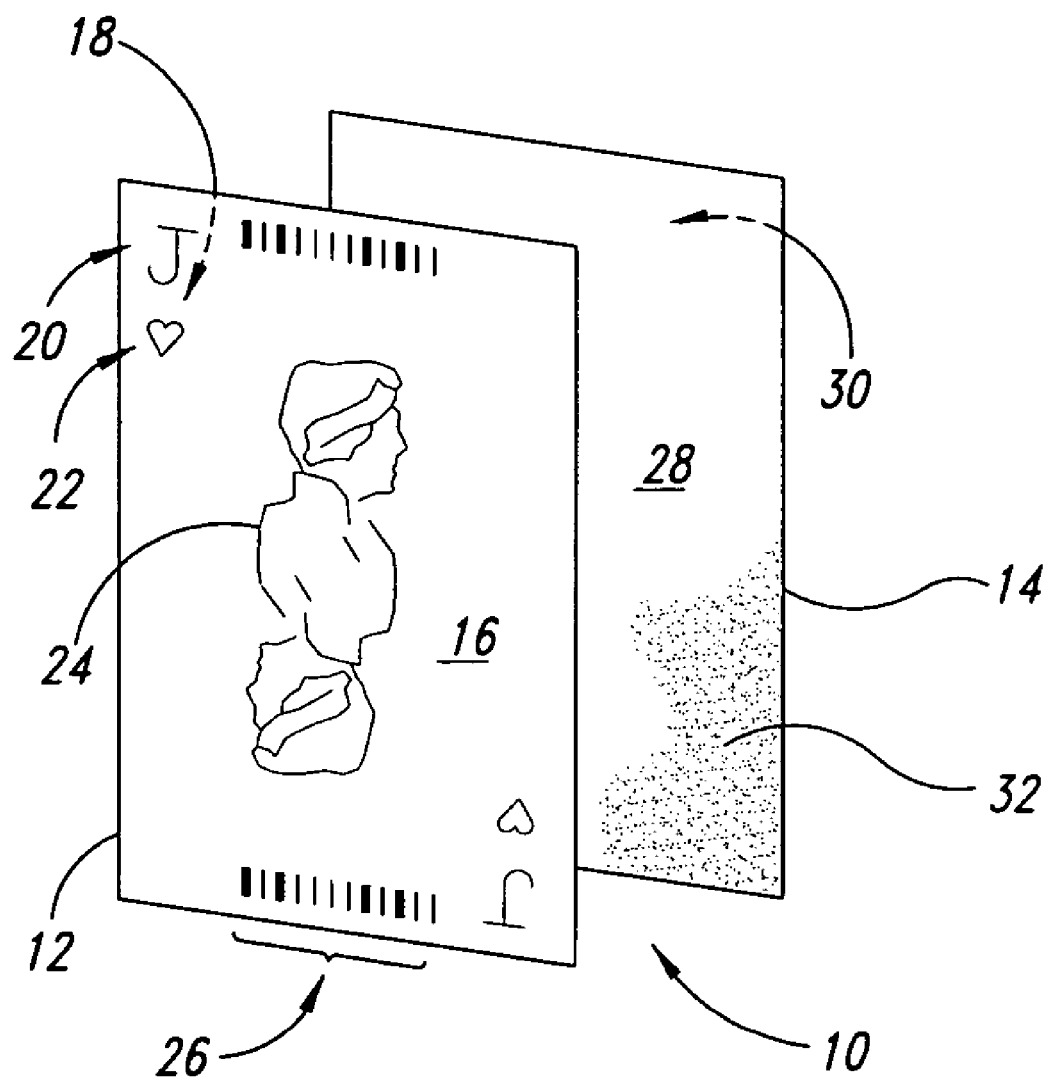
FIG. 1 is a front, right isometric view of a playing card according to one illustrated embodiment.

FIG. 1 shows a reconfigurable playing card 10 formed from a face 12 that is joined or coupled with a separate and distinct back 14. The face 12 and the back 14 can be made from a paper-based product, for example from card stock paper; from a vinyl-based sheet product; or from a plastic-based sheet product. One type of plastic-based sheet product that is used for making playing cards is cellulose acetate. In addition, the playing card 10 can be varnished to finish the cards and make them easy to handle. The amount and quality of varnish helps determine the slip and feel of the cards 10 (e.g., how the cards 10 slide against each other) and helps protect the cards 10 from grease and dirt.

The face 12 has a face surface 16 on one side and an attachment surface 18 on the opposing side. The face surface 16 caries a rank marking 20 and a suit marking 22, which may, for example, be printed or otherwise inscribed on the face surface 16. In addition, the face surface 16 may also carry a graphic 24, for example an image of a character of royalty such as a Jack, Queen, King, or Joker.

Additionally and alternatively in the illustrated embodiment, the face 12 carries machine-readable indicia 26, which may be printed or otherwise inscribed on the face 12. The machine-readable indicia 26 can uniquely identify the playing card 10 in a single set or deck and/or across multiple sets or decks of playing cards 10. For example, the machine-readable indicia 26 can encode a unique identifier, such as a serial number, for each card of a thousand decks of cards (e.g., 52,000 unique identifiers). The machine-readable indicia 26 may provide a measure of security for the issuing casino to assure that invalid or counterfeit playing cards are not being used in the casino. The machine-readable indicia 26 may be printed using an ink that is not typically visible to humans, when a specific wavelength of light is applied to the playing card, for example infrared or ultraviolet light, the machine-readable indicia 26 is illuminated and becomes visible. The playing card 10 can additionally, or alternatively include a radio frequency identification (RFID) transponder. Systems and methods for including machine-readable indicia on chips or radio frequency identification on playing cards are discussed in detail in U.S. Pat. No. 6,460,848, issued on Oct. 8, 2002, and U.S. Provisional Patent Application No. 60/463,978, filed on Apr. 17, 2003, respectively.

The back 14 has an attachment surface 28 and a back surface 30. In a standard deck of fifty-two playing cards, the back surface 30 of the playing cards 10 usually bears a non-unique pattern that is identical for each playing card 10 in at least one deck. The identical pattern assures that players cannot make an association between the back surface 30 and the value (i.e., rank and suit) on the face 12, unless the players engage in cheating and mark the back surfaces 30 of the cards.

In the illustrated embodiment, the face 12 and the back 14 can be at least temporarily attached together with a bonding substance 32, for example, an adhesive or wax-based material. The bonding substance 32 is applied to the attachment surface 28 of the back 14, the bonding surface 18 of the face 12, or both. For purposes of clarity, the bonding substance 32 is shown only in the lower right hand corner of FIG. 1 and applied to the attachment surface 28 of the back 14. The bonding substance 32 can take the form of a pressure sensitive adhesive with a bonding strength sufficient to at least temporarily secure the face 12 to the back 14 for at least one card game.

One type of adhesive that is suitable to bond the face 12 and the back 14 is an acrylic-based adhesive. An acrylic-based adhesive is formulated from acrylic polymers and relatively resistant to other potential damaging elements that may be found in a casino environment, for example solvents such as water and alcohol, ultraviolet light, smoke, and elevated temperatures. Acrylic adhesives demonstrate low to moderate initial tack and adhesion, which allows for a cleaner separation between the face 12 and the back 14. In addition, acrylic adhesives are generally clear in color.

Another type of adhesive that may be suitable is a thermal setting adhesive. The application of heat to the thermal setting adhesive can create a temporary bond between the face 12 and the back 14. A second application of heat, for example at an even higher temperature, can cause the adhesive to weaken or disbond. If the adhesive is merely weakened, the separation of the face 12 from the back 14 can be facilitated using a blade or separation bar to complete the disengagement of the respective constituent playing card components 12/14.

Devices for Separating Reconfigurable Playing Cards

Figure 2A:
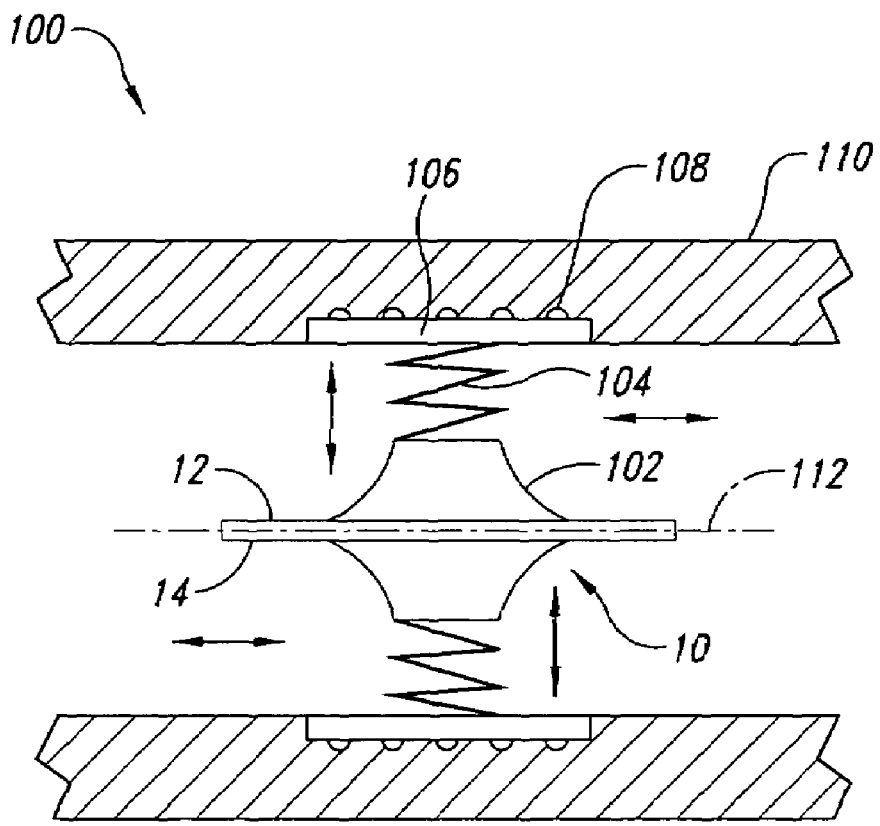
FIG. 2A is a schematically illustrates a card separating device according to one embodiment.

FIG. 2A schematically illustrates a separating device 100 according to one embodiment of the invention. The device 100 includes at least a gripper 102, a gripper actuation mechanism 104, and translation mechanism 106. In the illustrated embodiment, the gripper 102 is a suction device pressed onto the playing card 10. The amount of pressure between the gripper 102 and the face 12, for example, is a function of the amount of surface area of the playing card 10 that is covered by the gripper 102. In one embodiment, the gripper is a suction cup. In another embodiment, the gripper can be a plate with a perimeter seal such that the pressure between the plate and the playing card 10 can be adjusted either manually or automatically. The gripper 102 is attached to the gripper actuation mechanism 104, shown as a linear spring in the illustrated embodiment. The gripper actuation mechanism 104, in turn, is attached to a translation mechanism 106, which is provided with rollers 108 for riding on a track 110.

In operation, the separation device 100 receives the playing card 10 along a path (not shown). The gripper 102 is located along the path and is moved into contact with the face 12 and the back 14 of the playing card 10 by the gripper actuation mechanism 104 as indicated by the up/down arrows. Once the gripper 102 sufficiently attaches to the face 12 and the back 14, respectively, the translation mechanisms 106 are moved in opposing directions as indicated by the side-to-side arrows. The movement of the translation mechanism 106 creates a shearing force along a shear plane 112, which is located between the face 12 and the back 14. The initial rate of the translation mechanisms 106 may be rather slow in order to overcome the static strength of the bonding substance 32. However, once the applied shear force overcomes the static strength of the bonding substance 32, the rate of translation can be increased. Such an increase can provide for a smoother, cleaner separation of the face 12 from the back 14 of the playing card. Additionally or alternatively, heat or another agent (e.g., humidity, steam, or a solvent) may be applied to the playing card 10 in order to soften or weaken the bonding substance 32 before the shear force is applied. The addition of heat can have the advantage of lowering the viscosity of the bonding substance 32 and again, provide for a cleaner separation of the face 12 from the back 14.

Figure 2B:
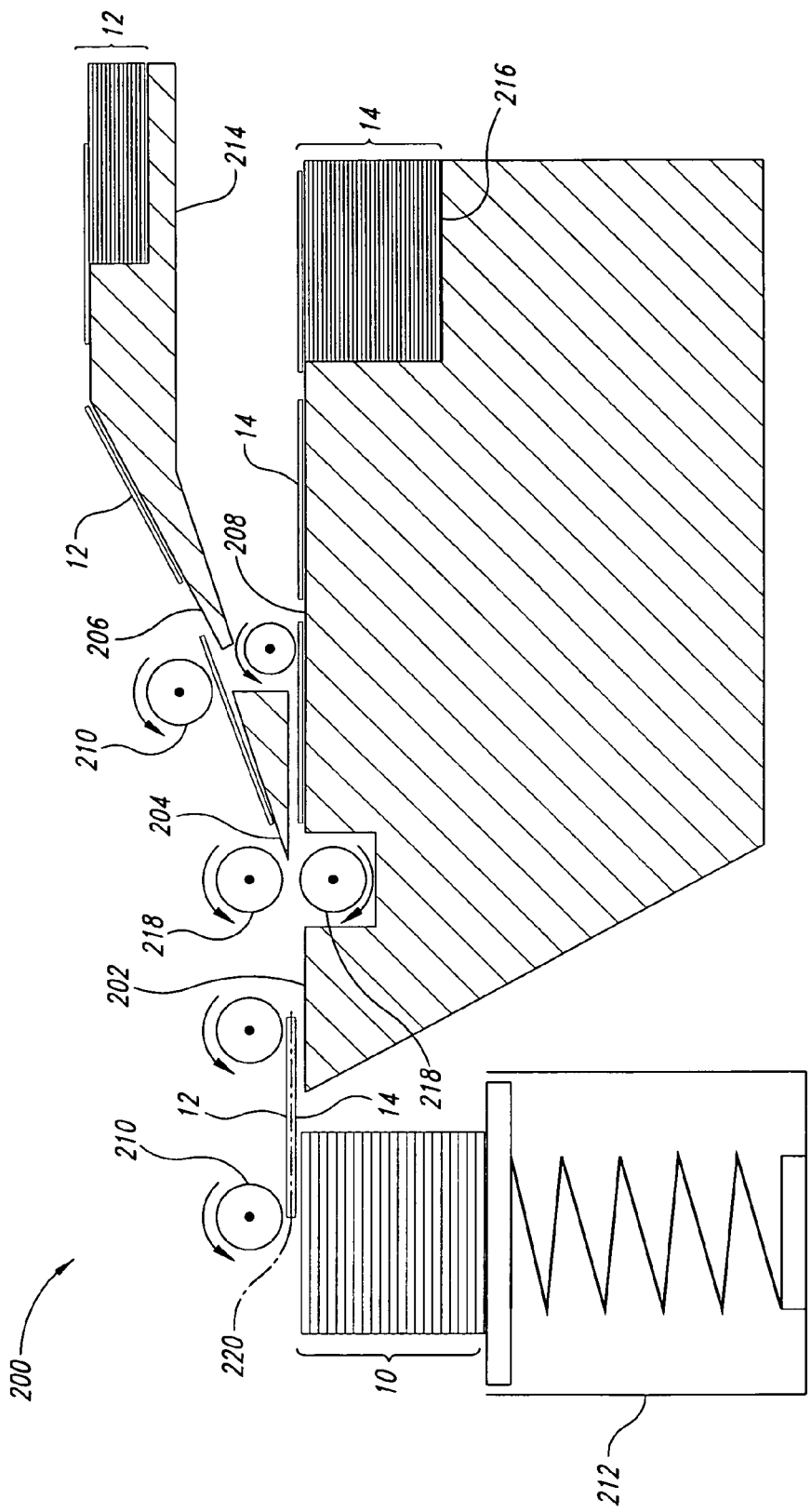
FIG. 2B is a schematically illustrates a card separating device according to another embodiment.

FIG. 2B schematically illustrates a separating device 200 according to another embodiment of the invention. In the illustrated embodiment, the separating device 200 comprises at least a first guide path 202, a splitter, 204, a second guide path 206, a third guide path 208, and a plurality of guide rollers 210. A first playing card bin 212 adjacent to the separating device 200 sequentially introduces playing cards 10 to the first guide path 202. A second bin 214 receives the separated faces 12, while a third bin 216 receives the separated backs 14.

Guide rollers 210 direct the playing cards along the first guide path 202 from the first playing card bin 212 to the splitter 204. A pair of alignment rollers 218 located just forward of the splitter 204 provide at least some pressure to the playing card 10 as the playing card 10 engages the splitter 204. The alignment rollers 218 direct the playing card 10 to engage the splitter 204 along a shear plane 220 of the playing card 10. The shear plane 220 is located between the face 12 and the back 14. In the illustrated embodiment, the rate of travel of the playing card 10 as it moves into engagement and continued engagement with the splitter 204 can be fairly constant. The splitter 204 separates the face 12 from the back 14 by severing at least some of the bonds formed by the bonding substance 32. As the face 12 and the back 14 are separated by the splitter 204, the face 12 is directed toward the second guide path 206 while the back 14 is directed toward the third guide path 208. Subsequent guide rollers 210 direct the face 12 to the second bin 214 while the back 14 is directed to the third bin 216. Although the playing cards 10 are introduced to the splitter 204 in the illustrated embodiment with the face 12 upward, one skilled in the art will appreciate that either the face 12 or the back 14 could face upward. Further, one skilled in the art will understand and appreciate that the sliding surfaces of the separating device 200 can be coated with Teflon® or some other type of friction-reducing substance to enhance the transition of the playing cards 10, faces 12, and backs 14 along their respective paths.

Methods of Separating and Assembling Reconfigurable Playing Cards

Figure 3:
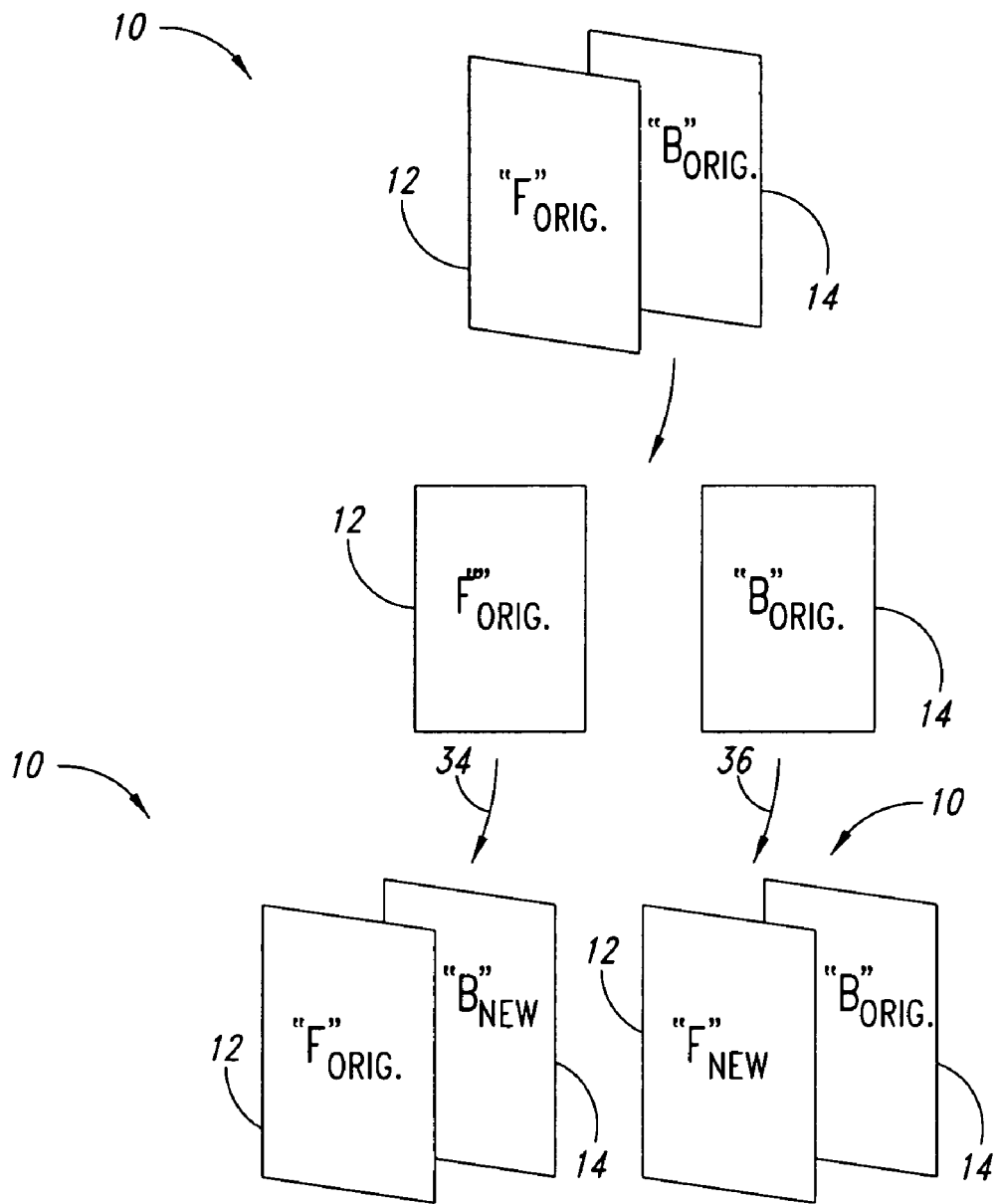
FIG. 3 is a schematic illustration indicating how playing cards are separated and reassembled card according to one illustrated embodiment.

FIG. 3 schematically illustrates the concept of separating and then re-combining either one, or both, of the constituent playing card components 12/14 in order to assuredly breakup or at least raise doubts regarding the pairings between faces 12 and backs 14, thereby rendering card marking strategies ineffective. Playing card 10 is shown separated into an original face "$F_{ORIG.}$" and an original back "$B_{ORIG.}$" Once the playing card 10 is separated into its respective face 12 and back 14, there are several ways to assure or at least raise doubts with respect to the pairings between the face and backs 12/14.

In a first method 34, as illustrated in FIG. 3, the original faces $F_{ORIG}$ are combined with new or fresh backs $B_{NEW}$ and the old backs $B_{ORIG}$ are discarded or recycled elsewhere. In a second method 36, the original backs $B_{ORIG}$ are combined with new or fresh faces $F_{NEW}$. In the aforementioned alternative, a casino would likely recycle the old faces $B_{ORIG}$, for example place them with a set of backs 14 from a different deck of playing cards 10.

Figure 4:
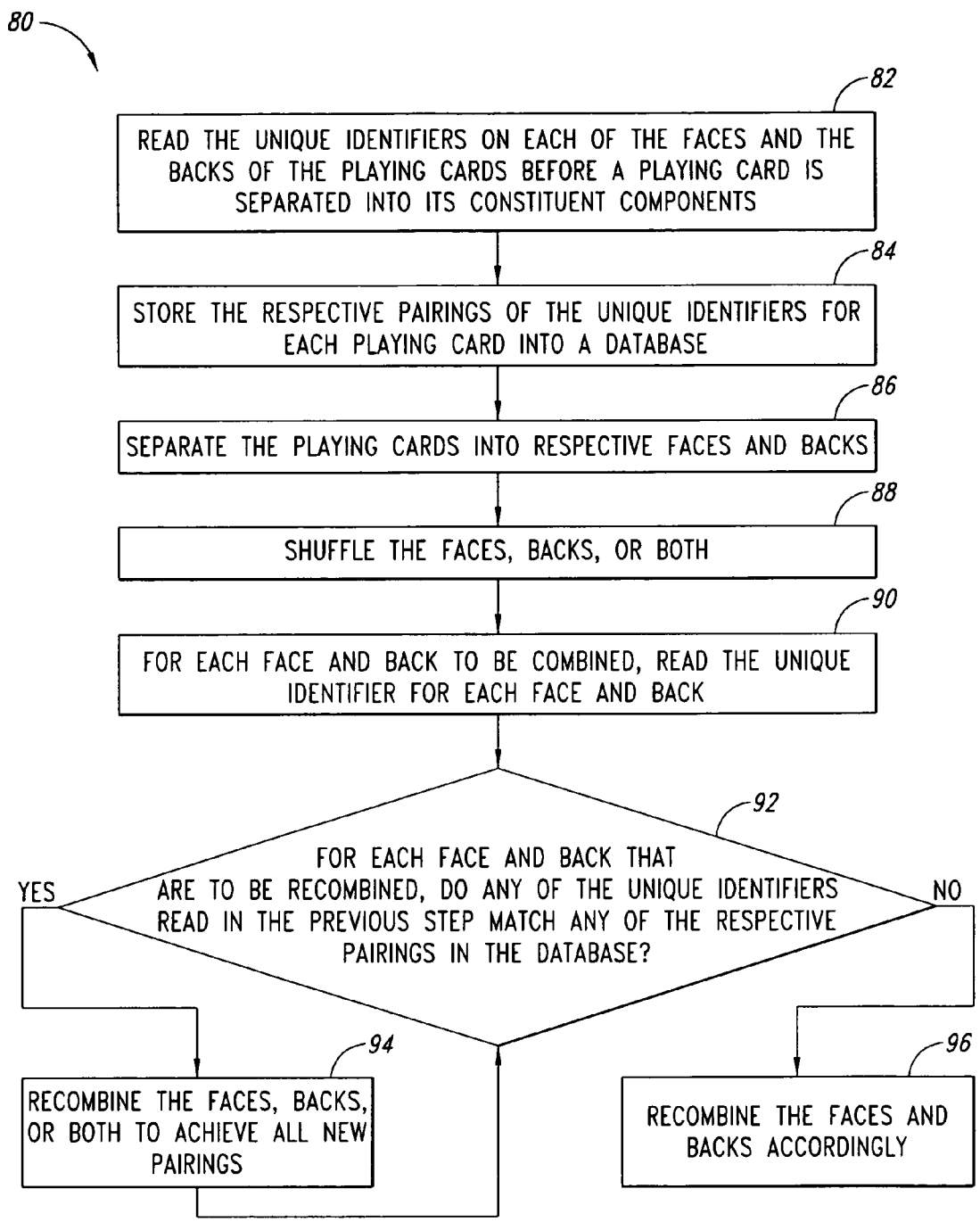
FIG. 4 is flow diagram of a method of assembling playing cards according to one illustrated embodiment.

A third method 80 is illustrated by the flow diagram of FIG. 4. Third method 80 assures that the faces 12 are not recombined with the same backs 14. In 82, a unique identifier 26, such as a serial number 26 (FIG. 1), located on each of the face 12 and the back 14 is read from the combined playing card 10, before the playing card 10 is separated into its constituent components. In the illustrated method, the unique identifier 26 is a machine-readable indicia. However, one skilled in the art will understand and appreciate that the unique identifiers 26 could be human readable indicia, as long as the present process was modified slightly.

In 84, each pair of unique identifiers 26, which represents the initial or original face/back pairings of each of the playing cards 10, are electronically linked and at least temporarily stored into a database. In 86, playing cards 10 are separated into respective faces 12 and backs 14. In 88, at least one of either the faces 12 or the backs 14 are shuffled or otherwise resorted in an order that differs from the order in which the playing cards 10 were separated.

In 90 and at some time before recombining the faces 12 and the backs 14, the unique identifiers 26 on each of the faces 12 and the backs 14 are re-read in relation to their re-sorted order. In 92, each pair of re-read unique identifiers 26 are cross-checked with the database as a means of verifying that all of the original face/back pairings will be converted to different face/back pairings. If the crosscheck of the database identifies that some of the face/back pairings have not been altered, then in 94, either the faces 12, backs 14, or both can be manipulated (e.g., shuffled or sorted). Once it has been verified that the recombination of the faces 12 and the backs 14 will not result in any of the original face/back pairings being re-established, the respective faces 12 and backs 14 can be recombined in 96.

Additionally, there are three methods of raising doubts in the minds of potential cheaters as to whether card marking strategies are being rendered ineffective. The first method is to reshuffle only the original faces 12, before recombining the original faces 12 with the original backs 14. Reshuffling does not assure that the some of the original pairs will not be recombined, but is likely to result in the majority of original pairings being different than the previous, original pairings. The second method for creating doubt is to reshuffle only the original backs 14 before recombining them with the original faces 12. Finally, the third method for creating doubt is to shuffle both the faces 12 and the backs 14, then recombine the constituent playing card components. The act of shuffling either the original faces 12, the original backs 14, or both is likely break up the previously existing pairings, but it will not necessarily assure or guarantee such a break up.

One aspect of reusing back 14 with the new or different face 12 is that a cheating player, upon seeing the marked playing card 10 dealt again in a subsequent card game, is likely to rely on the "marked" card 10 when considering playing strategy. Unfortunately for the cheating player, the marked card 10 likely no longer has the value (e.g., a particular rank and/or suit) that the cheating player had previously associated with the marked card 10. The cheating player will quickly learn that card marking strategies are of no avail. A casino may even choose to publicly advertise that their playing cards are separated and then recombined as a means of deterring cheating from the start.

Figure 5:
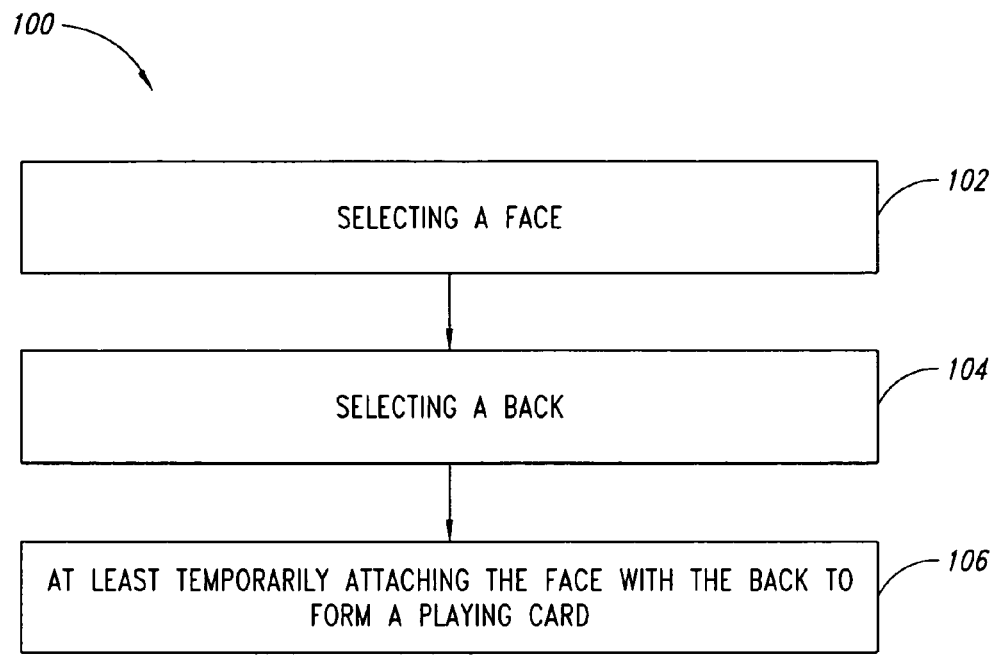
FIG. 5 is flow diagram of a method assembling a playing card according to one illustrated embodiment.

FIG. 5 is a flow diagram illustrating a method 100 of assembling a face 12 and a back 14 together to make a playing card 10. In 102 and 104, the face 12 and the back 14 are selected, respectively. In 106, the face 12 is at least temporarily attached with the back 14 to form a playing card 10. The attachment is temporary because at some later time, the constituent components of the playing card 10 can be separated and reassembled such that the original relationship between the particular face 12 and the particular back 14 is disrupted.

Figure 6:
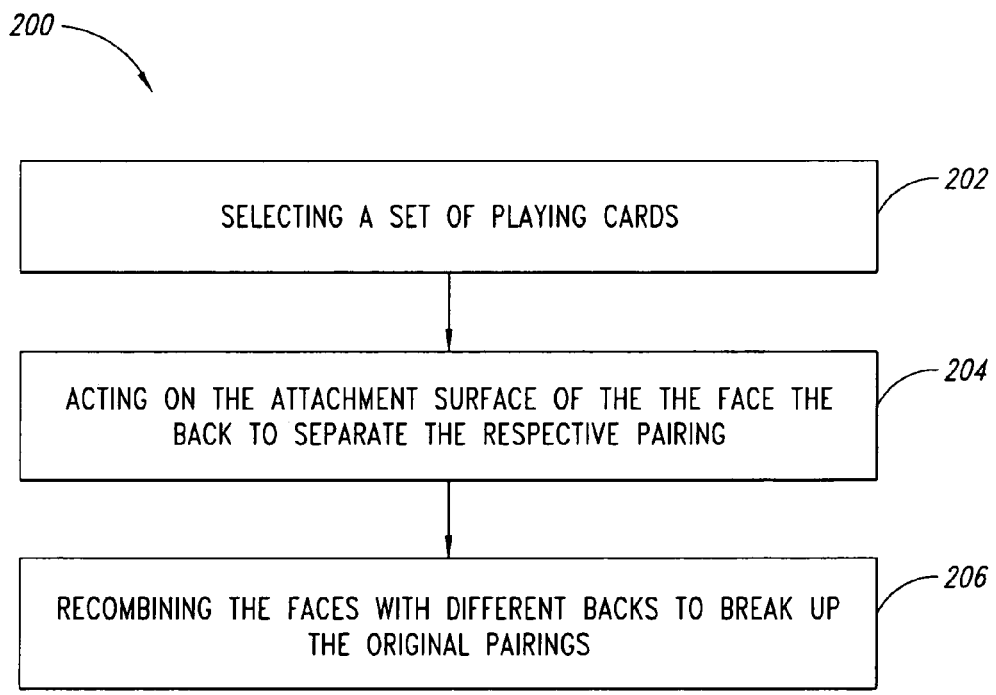
FIG. 6 is flow diagram of a method of separating and reassembling a playing card according to one illustrated embodiment.

FIG. 6 is a flow diagram illustrating a method 200 of separating and reassembling a set of playing cards 10 according to one embodiment. In 202, the set of playing cards 10 is received. The set of playing cards 10 can be assembled by gathering the playing cards 10 used over the course of several card games, by gathering cards from various gaming tables, by gathering the cards from simply one deck or one card shoe (i.e., typically between two to eight decks) of playing cards, or by gathering cards that have been placed in a discharge bin. The set of playing cards 10 can be a standard deck of fifty-two playing cards, several standard decks, or some other number of cards whether in standard decks or not. If the set of cards 10 cannot be factored by the number "52" or if the pattern on the backs of the cards is not the same, then in one embodiment the set can be sorted either automatically or manually so that the end result of the separation and reassembly method 200 provides a set of cards where the set can be some number of standard fifty-two card playing decks.

In 204, the interface of the playing card 10 can be acted on in some manner to separate the playing card 10 into the card's constituent components (e.g., original face and original back). In the present embodiment, the back 14 can be interchanged with the face 12.

Once the respective constituent playing card components are apart, at 206 the original face 12 is combined with a different back 14. Where the new pairing between the faces 12 and backs 14 are either purposely changed or selected randomly, this recombination breaks up the original pairing between the original face 12 and the original back 14. Therefore, if a player had marked one of the playing cards 10, the next time the cards are dealt, the marked card 10 would likely be represented by a face 12 that carried a different rank and/or a different suit marking, much to the chagrin of the cheating player.

Recombining or reassembling the face and backs 12/14 into new playing cards 10 can be accomplished with the application of a bonding substance 32 on at least one of the adjoining surfaces 18/28 (FIG. 1). The bonding substance 32 can be applied in a number of ways, such as rolling, spraying, or wiping the bonding substance 32 onto either, or both of the adjoining surfaces 18/28. The characteristics of the bonding substance 32 can permit the bond between the adjoining surfaces 18/28 to quickly set up, or set up over a period of time. As discussed above, the bonding substance 32 can be a wax-based material or a pressure sensitive adhesive.

If the bonding substance 32 is a pressure sensitive adhesive, for example, the action of recombining the constituent playing card components 12/14 can include squeezing out excess adhesive. Bonds formed between substrate components with pressure sensitive adhesive creates a polar attraction between the adhesive and the substrate as long as the adhesive is sufficiently applied to wet-out the substrate surface.

Figure 7A:
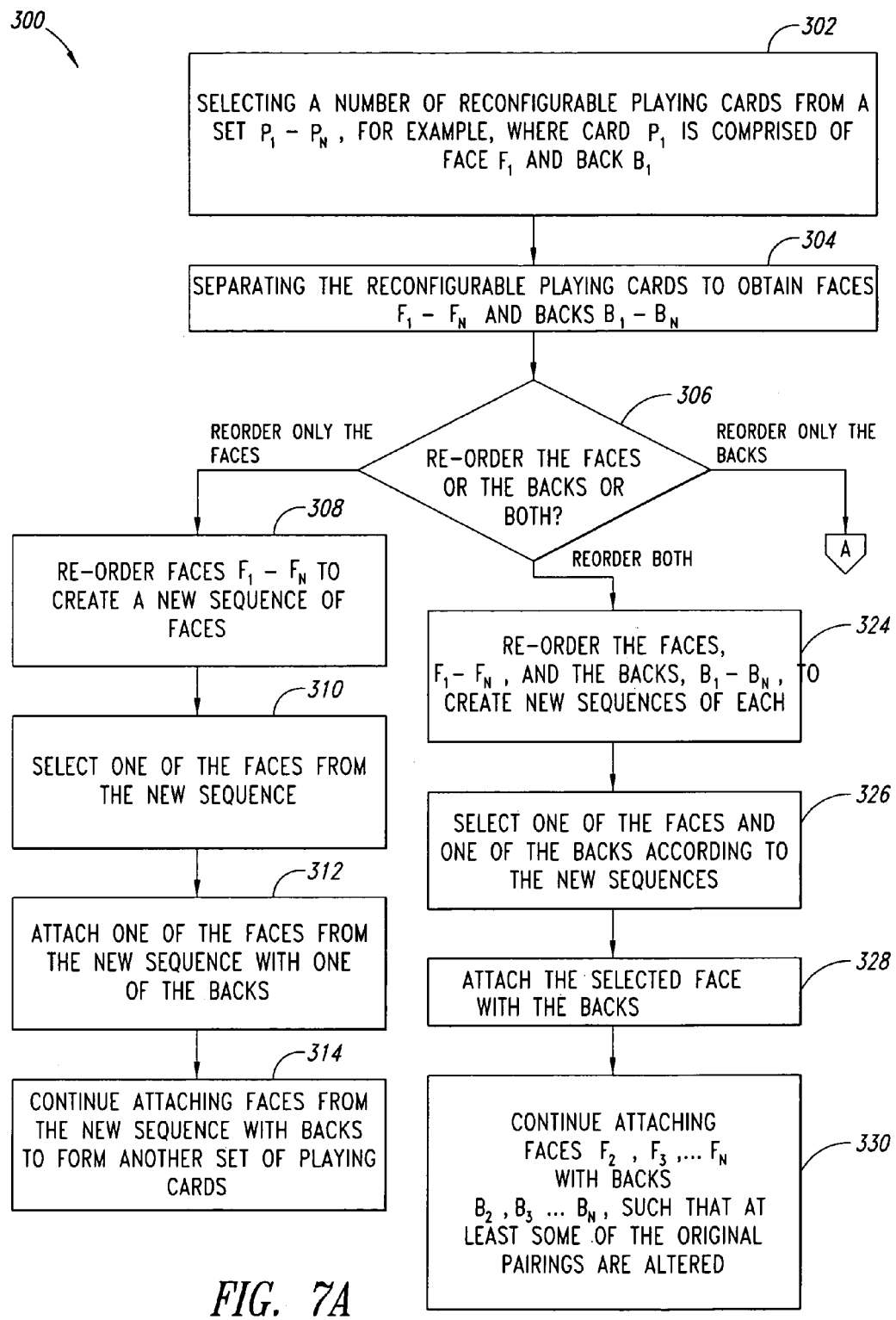
FIG. 7A is a flow diagram of a method of separating, re-ordering, and reassembling a set of playing cards according to one illustrated embodiment.
Figure 7B:
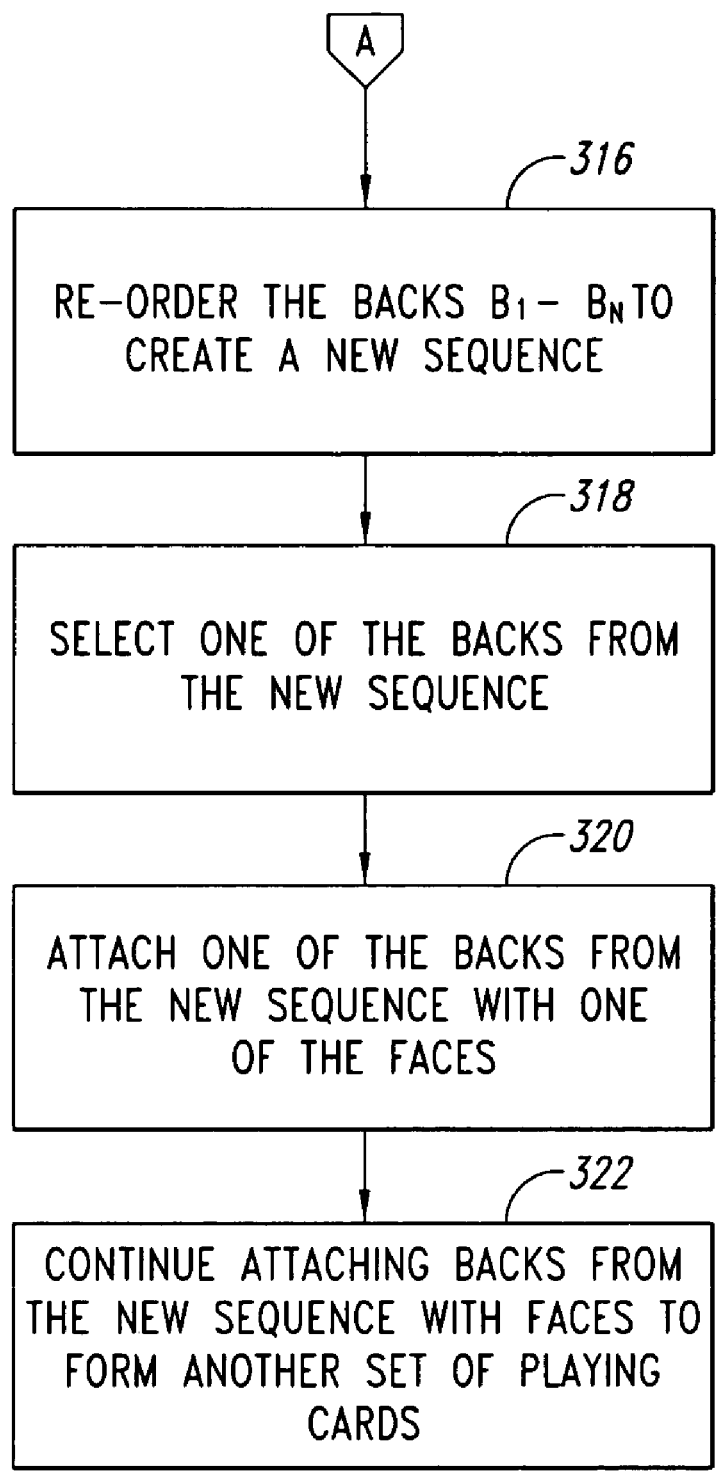
FIG. 7B is a continuation of the flow diagram of FIG. 7A.

FIG. 7 illustrates a method 300 of separating, re-ordering, and then reassembling a set of playing cards 10 according to another illustrated embodiment. At 302, a set of playing cards $P_1$-$P_N$ is selected, where card $P_1$ is comprised of a face $F_1$ and a back $B_1$, card $P_2$ is comprised of face $F_2$ and back $B_2$, and so on. At 304, each of the cards $P_1$-$P_N$ are separated into their respective faces 12 and backs 14.

At 306, the faces, $F_1$-$F_N$, the backs, $B_1$-$B_N$, or both can be re-ordered to create a new sequence of the respective constituent playing card components 12/14. In a first example shown in 308, only the faces, $F_1$-$F_N$, are re-ordered into a new sequence. The re-ordering can be done manually by shuffling by hand, mechanically by shuffling with a mechanical shuffler, or computationally by generating a sequence of cards and sorting the faces 12 into that sequence. In one aspect, a random or pseudo-random generated sequence can be employed. Random number generation on computers is well known in the computing arts. Mathematicians do not generally consider computer generated random numbers to be truly random, and thus commonly refer to such numbers as being pseudo-random. However such numbers are sufficiently random for most practical purposes, such as distributing playing cards to players. Hence, while we denominate the computer generated values as being pseudo-random, this term, as used herein and in the claims, should include any values having a suitable random distribution, whether truly mathematically random or not. Systems, devices, and methods for generating a pseudo-random sequence of playing cards is discussed in detail in U.S. Pat. No. 6,638,161, issued on Oct. 28, 2003.

At 310, faces 12 are selected from the new sequence. At 312, the selected face 12 is attached with a first back 14, where the backs 14 were not re-ordered after the playing cards were separated back in 304. However, the face 12 selected from the new sequence will have a high probability of not being paired up with its former back 14, from which it was originally separated. Therefore, the original pairing that existed between the face $F_1$ and the back $B_1$ would likely be terminated because the shuffling of the faces 12 would heighten the probability that the former back $B_1$ would be combined with a different face, $F_2$-$F_N$. At 314, the remaining faces 12 corresponding to the new sequence are attached to the backs 14 resulting in another set of playing cards, albeit with at least a majority of new pairings between the faces 12 and the backs 14.

At 316, now only the backs, $B_1$-$B_N$, are re-ordered into a new sequence. The actions at 316 through 322 closely track the actions 308 through 314 above, however the role of the faces 12 is replaced by the backs 14 herein. At 318, a back 14 is selected from the new sequence. At 320, the selected back 14, which likely no longer corresponds to the original back $B_1$ due to the re-ordering of the backs 14, is combined with face $F_1$. At 322, the rest of the re-ordered backs 14 are combined with the faces 12 to once again create another set of playing cards with at least some new pairings between the respective faces 12 and backs 14.

At 324, the faces, $F_1$ through $F_N$, and the backs, $B_1$ through $B_N$, are re-ordered; again either by shuffling or re-sorting. One advantage of reordering both the faces 12 and backs 14 is that it can enhance the randomness with respect to the respective sequences of the faces 12 and the backs 14. Thus, reordering both the faces 12 and the backs 14 can further reduce the chance that a marked back 14 would be recombined with its former face 12. At 326, one of the faces 12 and one of the backs 14 are selected from their new respective sequences. At 328, the selected faces 12 and backs 14 are coupled together. Finally, at 330, each of the remaining faces 12 and backs 14 are respectively coupled together, thus providing yet another set of playing cards where at least some of the original pairings between the faces 12 and the backs 14 have been broken up or altered.

Methods of Playing a Card Game Using Reconfigurable Playing Cards

Figure 8:
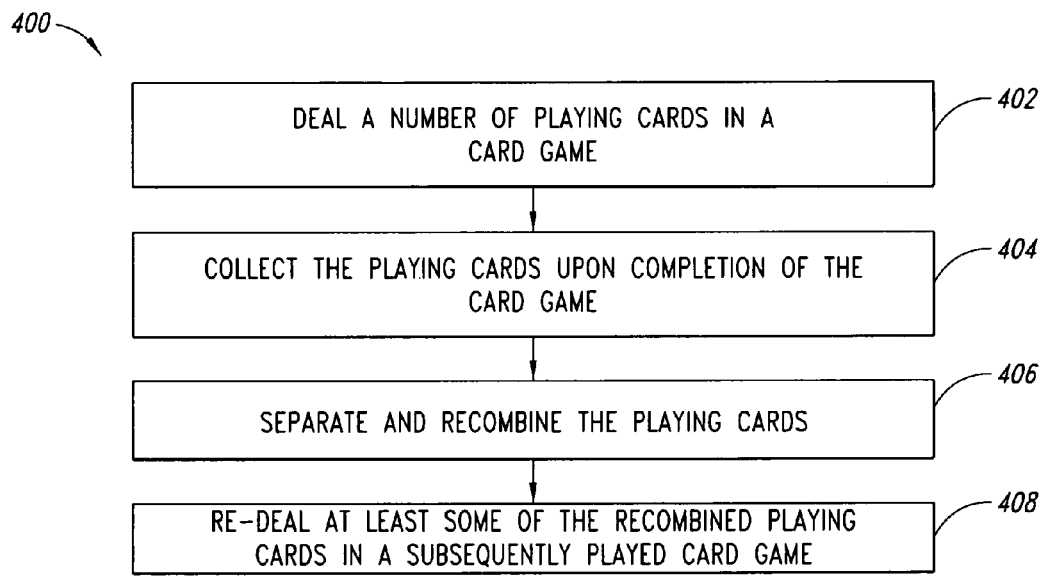
FIG. 8 is a flow diagram of a method of using a playing card during a card game according to one illustrated embodiment.

FIG. 8 is another flow diagram illustrating a method 400 of using, playing cards 10 during a card game according to one illustrated embodiment. Before an initial card game is dealt, the component parts of the playing cards 10 are selected from bins within the card separation/distribution device (as shown schematically in FIGS. 2 and 3). The faces 12 can be pre-printed and stored in bins in a pseudo-random sequence that is manually, mechanically, and/or computationally generated. This sequence may or may not be known by the casino. In another embodiment, the faces 12 can be printed in real time just prior to their assembly with the backs 14. Systems and methods for storing cards in bins in a pseudo-random generated order, for generating a pseudo-random sequence, and for printing playing cards in real time are discussed in detail in U.S. Provisional Patent Application No. 60/509,802, filed on Oct. 8, 2003 and U.S. patent application Ser. No. 10/017,276, filed on Dec. 31, 2001.

At 402, a number of playing cards 10 are dealt in a card game. After the card game is complete, the playing cards 10 are collected at 404. For instance, the dealer can collect the cards 10 in a given order based on the player's position at the table, which is a common method of collecting played cards in the game of blackjack. In one optional embodiment, the dealer can route the collected cards through a discard reader in order to read the machine-readable indicia 26 located on the playing cards 10. Thus, if the discard reader identifies an unrecognizable or invalid machine-readable symbol 26, the casino security could be alerted since the card in question may be counterfeit, scratched, tampered with, or too worn to use. In some embodiments, the discard reader can also identify irregularities associated with the playing card 10, like various markings, such as scratches or bends. Devices, systems, and methods for reading machine-readable indicia from playing cards are discussed in detail in U.S. patent application Ser. No. 09/790,480, filed on Feb. 21, 2001. Devices for detecting various markings on playing cards are discussed in detail in U.S. Pat. No. 6,460,848, filed on Dec. 30, 1999.

At 406, the collected cards are separated and recombined into another set of playing cards according to the method 200, discussed above. At least some of the playing cards are re-dealt for a subsequently played card game at 408. In the event that one of the players had marked one or more of the playing cards 10, the cheating player would now be unwittingly employing card playing strategies and wagering strategies based on the erroneous assumption that the marked card 10 had a certain value.

Although specific embodiments of and examples for the card distribution device and method of operating the same are described herein for illustrative purposes, various equivalent modifications can be made without departing from the spirit and scope of the invention, as will be recognized by those skilled in the relevant art. The teachings can apply to any type of card game where a random or pseudo-random distribution of playing cards is desired, such as baccarat, 5-card stud poker, Caribbean stud poker, Tai Gow poker, Hi/Low, and LET-IT-RIDE®. The card separation and reassembly system can be used with a large number of players and in environments other than casinos, such as taverns, betting parlors, and even homes. The systems, devices, and methods described herein can be used at casino tables or in the back room of a casino establishment. Additionally, the methods described above may include additional steps, omit some steps, and perform some steps in a different order than illustrated.

The various embodiments described above can be combined to provide further embodiments. All of the above U.S. patents, patent applications and publications referred to in this specification as well as U.S. Pat. No. 6,460,848, issued on Oct. 8, 2002; U.S. Pat. No. 6,638,161, issued on Oct. 28, 2003, U.S. Provisional Patent Application No. 60/463,978, filed on Apr. 17, 2003; U.S. Provisional Patent Application No. 60/509,802, filed on Oct. 8, 2003; U.S. patent application Ser. No. 10/017,276, filed on Dec. 31, 2001; and U.S. patent application Ser. No. 09/790,480, filed on Feb. 21, 2001 are incorporated herein by reference. Aspects of the invention can be modified, if necessary, to employ devices, features, and concepts of the various patents, applications and publications to provide yet further embodiments of the invention.

These and other changes can be made to the invention in light of the above detailed description. In general, in the following claims, the terms used should not be construed to limit the invention to the specific embodiments disclosed in the specification and the claims, but should be construed to include all playing cards and related methods that operate in accordance with the claims. Accordingly, the invention is not limited by the disclosure, but instead its scope is to be determined entirely by the following claims.

The invention claimed is:

1. A device for separating a playing card, the playing card having a face comprising a face surface and a first attachment surface opposed from the face surface, the face surface carrying at least one human-readable rank marking and at least one human-readable suit marking, a back having a back surface and an attachment surface opposed from the back surface, the back surface carrying a non-unique pattern, the device comprising:
    means for guiding the playing card along a path;
    means for driving the playing card along the path; and
    means for applying a separating force while the playing card is driven down the path, the separating force being sufficient to dislodge the face from the back along a shear plane.

2. The device of claim 1 wherein driving the playing card along the path comprises directing the playing card between two adjacently located pinch rollers located proximate to the path.

3. The device of claim 1 wherein applying the separating force while the playing card is driven down the path includes inserting a blade between the attachment surface of the face and the attachment surface of the back.

4. The device of claim 1 wherein applying the separating force while the playing card is driven down the path further includes:
    attaching the face to a first gripper and attaching the back to a second gripper; and
    moving either gripper in a direction away from the other respective gripper.

5. The device of claim 1, further comprising:
    means for applying heat to the playing card to at least weaken a bonding substance located between the attachment surface of the face and the attachment surface of the back.

* * * * *